(12) United States Patent
Chen

(10) Patent No.: US 6,409,279 B1
(45) Date of Patent: Jun. 25, 2002

(54) BICYCLE WHEEL WITH A HUB PROVIDED WITH MOUNTING SEATS FOR MOUNTING SPOKES THEREON

(75) Inventor: Chao-Ying Chen, Tainan Hsien (TW)

(73) Assignee: Alex Machine Industrial Co., LTD, Tainan Hsien (TW)

( * ) Notice: Subject to any disclaimer, the term of this patent is extended or adjusted under 35 U.S.C. 154(b) by 0 days.

(21) Appl. No.: 09/923,129

(22) Filed: Aug. 6, 2001

(51) Int. Cl.$^7$ .................. B60B 1/02; B60B 21/06; B60B 1/06; B60B 3/00
(52) U.S. Cl. .................. 301/59; 301/61; 301/75; 301/80
(58) Field of Search .................. 301/55, 58, 59 I, 301/60, 61, 64.704, 67, 68, 73, 74, 75, 78, 79, 80, 84, 110.5

(56) References Cited

U.S. PATENT DOCUMENTS

| | | | | |
|---|---|---|---|---|
| 43,651 A | * | 7/1864 | Woodard | 301/59 |
| 348,635 A | * | 9/1886 | Nolen | 301/59 |
| 430,687 A | * | 6/1890 | Reinhold | 301/59 |
| 475,583 A | * | 5/1892 | Little | 301/80 |
| 487,283 A | * | 12/1892 | Little | 301/59 |
| 552,233 A | * | 12/1895 | Caborn | 301/59 |
| 608,210 A | * | 8/1898 | McCoy | 301/59 |
| 1,084,620 A | * | 1/1914 | Forrester | 301/80 |

FOREIGN PATENT DOCUMENTS

FR 2707559 A1 * 1/1995 .................. 301/59

* cited by examiner

Primary Examiner—S. Joseph Morano
Assistant Examiner—Jason R. Bellinger
(74) Attorney, Agent, or Firm—Ladas & Parry

(57) ABSTRACT

A bicycle wheel includes a hub and a plurality of mounting seats arranged around the hub and pivoted to the hub for pivoting about axes parallel to an axis of the hub. A plurality of spokes have outer ends mounted on a wheel rim, and inner ends mounted on the mounting seats for mounting the wheel rim on the hub.

5 Claims, 5 Drawing Sheets

BICYCLE WHEEL WITH A HUB PROVIDED WITH MOUNTING SEATS FOR MOUNTING SPOKES THEREON

BACKGROUND THE INVENTION

1. Field of the Invention

The present invention relates to a bicycle wheel, more particularly to a bicycle wheel having a hub provided with a plurality of pivotable mounting seats for mounting spokes on the hub.

2. Description of the Related Art

Referring to FIG. 1, a conventional bicycle wheel includes a wheel rim 11 mounted on a hub 10 by means of a plurality of spokes 12. The hub 10 has left and right end portions, each of which is formed with an axially extending annular flange 101 that is formed with a plurality of spoke fastening holes 103 for receiving spoke fasteners 13. As shown, the annular flange 101 forms an angle ($\alpha$) of about 90 degrees with an adjacent end face of the hub 10. Since the spokes 12 extend radially, the annular flanges 101 are susceptible to deformation due to tension forces applied by he spokes 12. Moreover, fine adjustment of the positions of the spoke fastening holes 103 is not possible. As such, the spoke fastening holes 103 of the hub 10 must be formed with a high accuracy to ensure alignment with corresponding spoke mounting holes in the wheel rim 11, thereby complicating the manufacture of the hub 10.

SUMMARY OF THE INVENTION

The main object of the present invention is to provide a bicycle wheel having a hub which is easier to manufacture and which is mounted with a plurality of mounting seats for connecting spokes to the hub.

Accordingly, the bicycle wheel of the present invention is adapted to be installed on a wheel axle, and includes a hub, a plurality of mounting seats, a wheel rim, and a plurality of spokes. The hub is adapted to be mounted rotatably on the wheel axle, and has left and right end portions which are opposite to each other along an axis of the wheel axle. Each of the left and right end portions is formed with an annular mounting flange which extends around the axis of the wheel axle. The mounting seats are arranged around the axis of the wheel axle, and are mounted pivotally on the mounting flanges of the hub. The wheel rim is disposed around the hub and the mounting seats, and includes an annular tire retaining portion and an annular spoke mounting portion extending radially and inwardly from the tire retaining portion. The spokes have outer ends mounted on the spoke mounting portion of the wheel rim, and inner ends mounted on the mounting seats for mounting the wheel rim on the hub.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
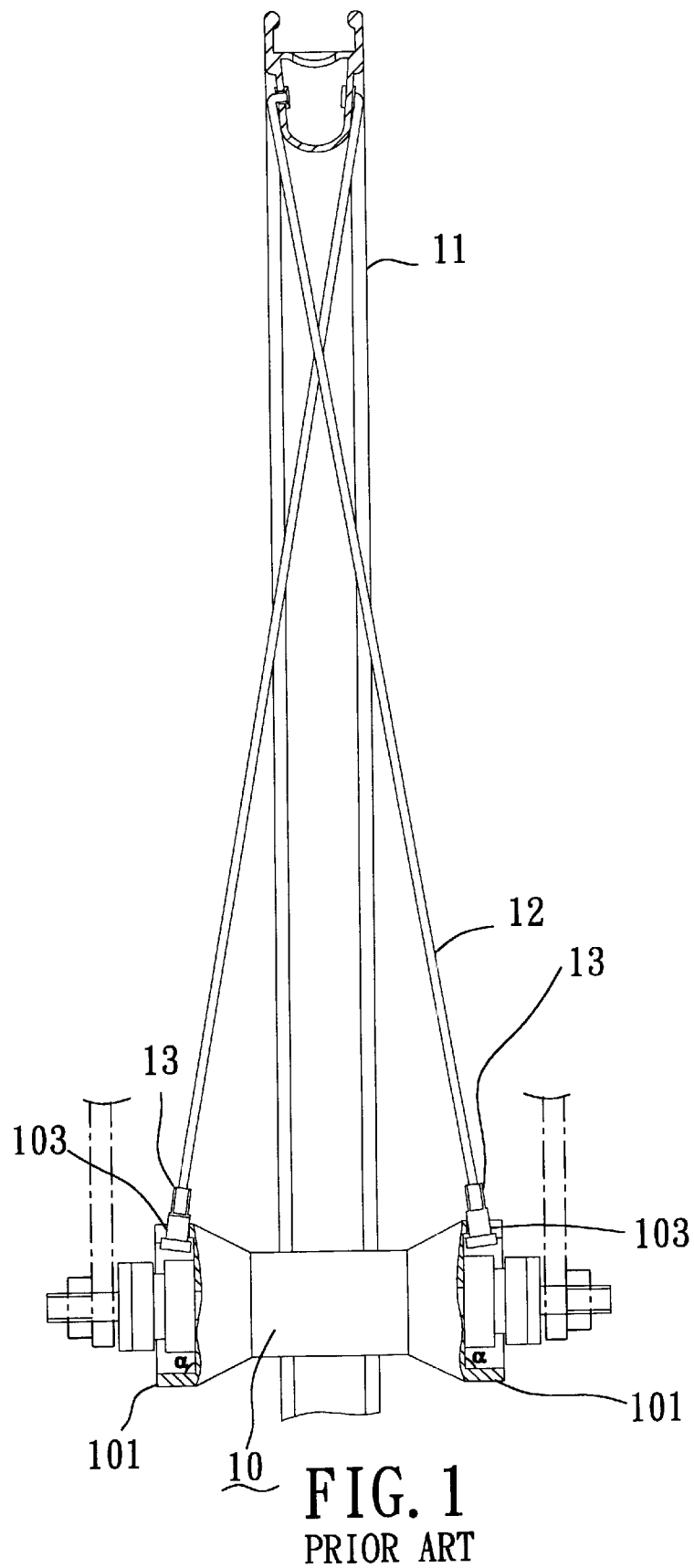
FIG. 1 is a fragmentary cross-sectional view of a conventional bicycle wheel.

Before the present invention is described in greater detail, it should be noted that like elements are denoted by the same reference numerals throughout the disclosure.

Figure 2:
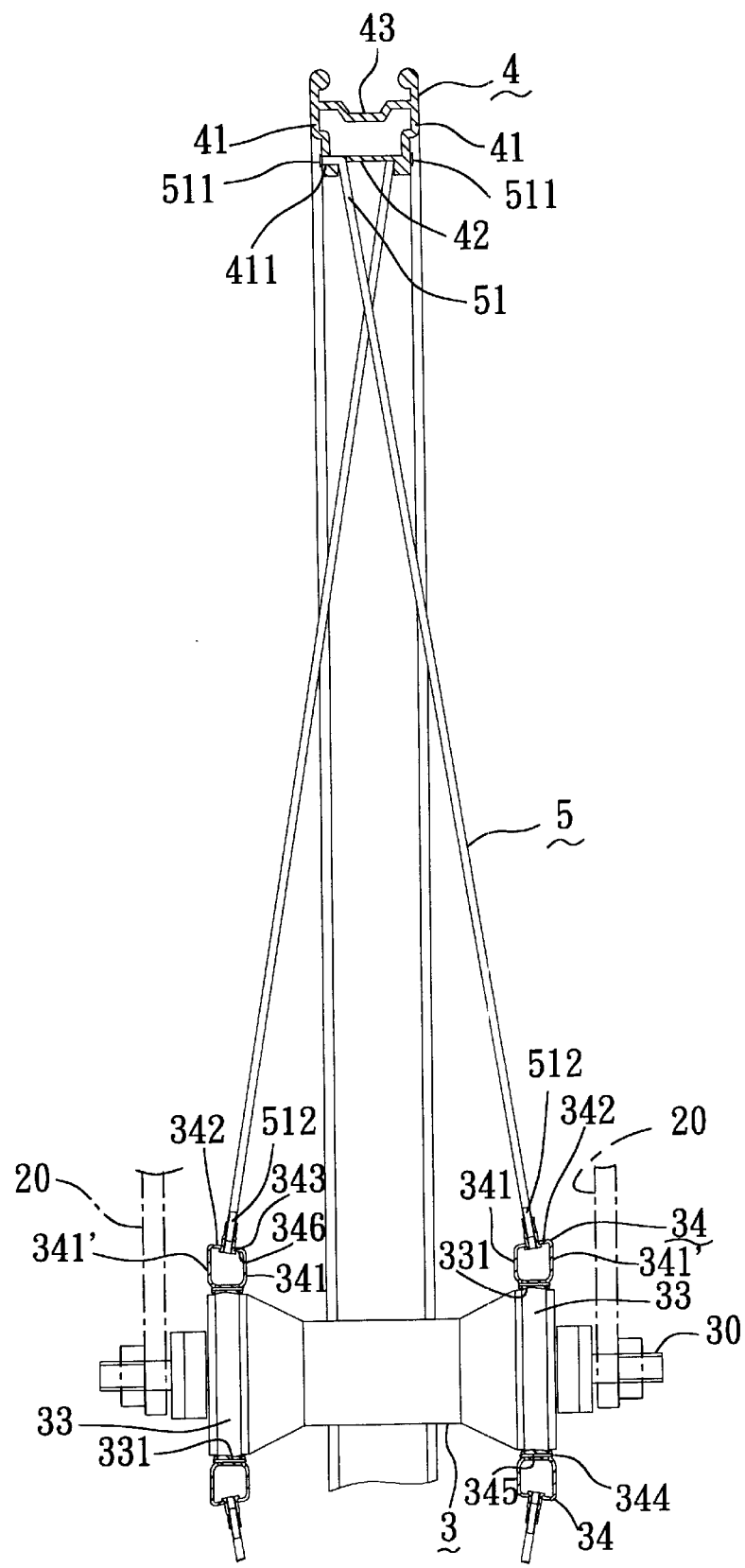
FIG. 2 fragmentary cross-sectional view of the first preferred embodiment of a bicycle wheel according to resent invention.
Figure 3:
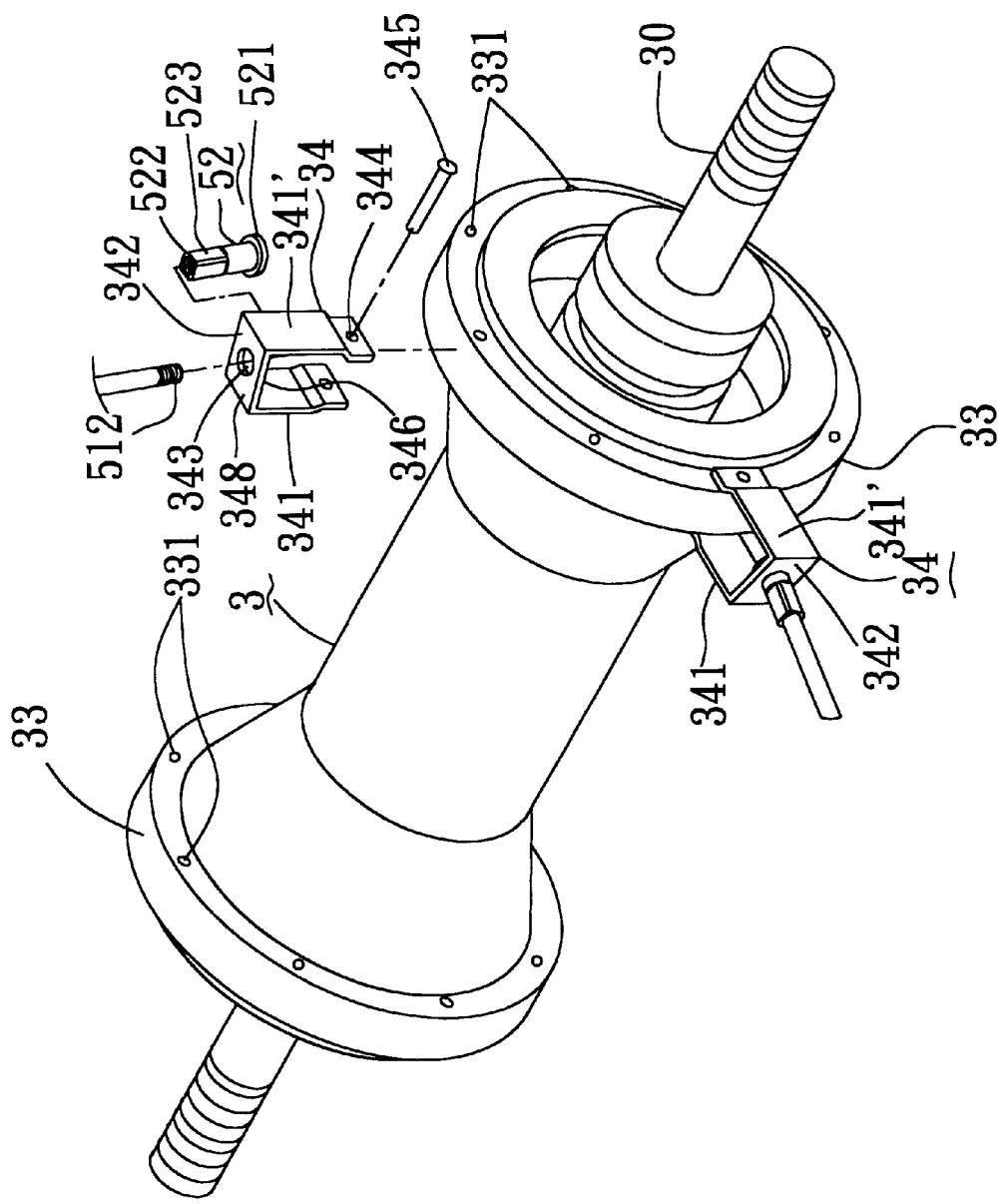
FIG. 3 is a fragmentary exploded perspective view of the first preferred embodiment.

Referring to FIGS. 2 and 3, the first preferred embodiment of a bicycle wheel according to the present invention is adapted to be installed on a wheel axle 30 that has two opposite ends carried by two prongs 20 of a bicycle fork, and is shown to include a hub 3, a plurality of mounting seats 34, an annular wheel rim 4, and a plurality of spokes 5.

The hub 3 is adapted to be mounted rotatably on the wheel axle 30, and has left and right end portions which are opposite to each other along the axis of the wheel axle 30 and which are each formed with an annular mounting flange 33 that extends around the axis of the wheel axle 30 and that projects radially and outwardly from the hub 3. Each of the mounting flanges 33 is formed with a plurality of angularly displaced pivot holes 331 therethrough. The pivot holes 331 are arranged around and are angularly spaced apart relative to the wheel axle 30, and have axes parallel to the axis of the wheel axle 30.

The mounting seats 34 are arranged around the mounting flanges 33. Each of the mounting seats 34 is formed by bending a metal plate, and includes a pair of side walls 341, 341' which are disposed on opposite left and right sides of a corresponding one of the mounting flanges 33, and which have radial inner end portions formed with aligned through holes 344. Each of the mounting seats 34 further includes a mounting wall 342 extending transversely between and interconnecting radial outer edge portions of the side walls 341, 341'. The mounting wall 342 has an outer surface 348 confronting the wheel rim 4 and an inner surface 346 confronting the corresponding mounting flange 33, and is formed with a mounting hole 343 through the inner and outer surfaces 346, 348. The through holes 344 in the side walls 341, 341' of each of the mounting seats 34 are aligned with a respective one of the pivot holes 331 in the mounting flanges 33. A pivot shaft 345 extends through the through holes 344 in a respective one of the mounting seats 34 and through the respective pivot hole 331 for mounting the respective mounting seat 34 pivotally on a corresponding one of the mounting flanges 33 such that the mounting seat 34 is pivotable about the axis of the respective pivot hole 331.

The wheel rim 4 is disposed around the hub 3 and the mounting seats 34, and includes a pair of spaced-apart annular tire retaining walls 41, an annular connecting wall 43 extending between intermediate portions of the tire retaining walls 41, and an annular base wall 42 extending between radial inner ends of the tire retaining walls 41. The connecting wall 43 and radial outer sections of the tire retaining walls 41 constitute a tire retaining portion and cooperatively confine a tire retaining space thereamong. The base wall 42 and radial inner sections of the tire retaining walls 41 constitute a spoke mounting portion which is disposed radially and inwardly relative to the tire retaining portion. The radial inner section of each of the tire retaining walls 41 has a lateral outer surface, and is formed with a plurality of spoke mounting holes 411 therethrough.

Each of the spokes 5 extends through a respective one of the spoke mounting holes 411 and the base wall 42 in the wheel rim 4, and has an inner end 512 formed with an external screw thread and mounted on a respective one of the mounting seats 34 by means of a respective spoke fastener 52, which has an enlarged head portion 521 disposed within a respective one of the mounting seats 34 and abutting against the inner surface 346 of the mounting wall 342 of the respective mounting seat 34, and an internally threaded shank portion 522 connected to the head portion 521 and extending through the mounting hole 343 in the mounting wall 342 of the respective mounting seat 34 for connecting threadedly with the inner end 512 of the respective spoke 5. The shank portion 522 of each spoke fastener 52 has a tool operating section 523 with a non-circular outer periphery to permit operation thereof using a tool. Each of the spokes 5 further has an outer end 51 formed with an enlarged head portion 511 which abuts against the lateral outer surface of the radial inner section of a corresponding one of the tire retaining walls 41.

Figure 4:
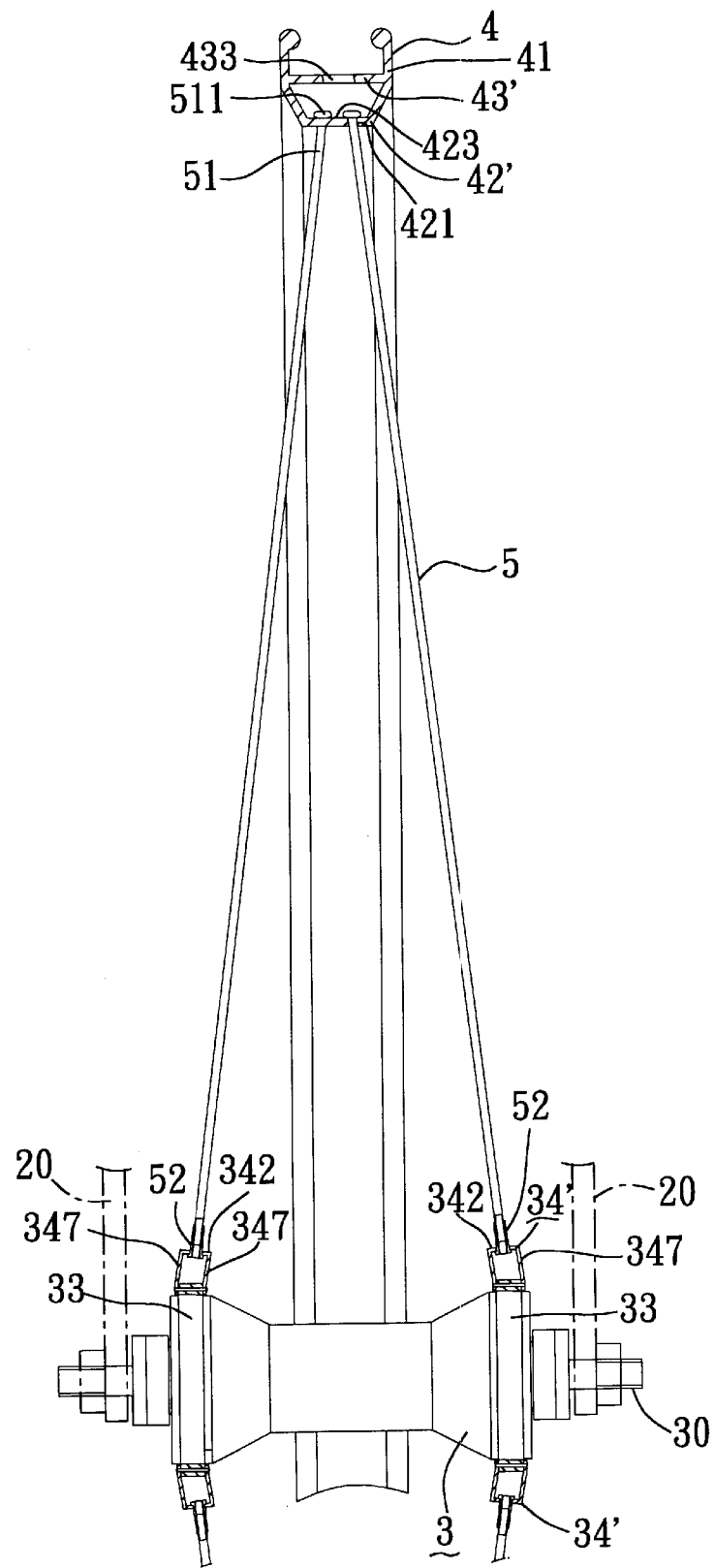
FIG. 4 is a fragmentary cross-sectional view of the second preferred embodiment of a bicycle wheel according to the present invention.

In the present embodiment, one of the side walls 341' of each of the mounting seats 34 that is disposed proximate to an adjacent end of the wheel axle 30 has a radial length longer than that of the other one of the side walls 341 such that the mounting wall 342 is inclined relative to the axis of the wheel axle 30 and is perpendicular to the corresponding spoke fastener 52. Referring to FIG. 4, in a second preferred embodiment of the present invention, the side walls 347 of each of the mounting seats 34' are inclined relative to a radial direction of the bicycle wheel so as to dispose the mounting wall 342 at an inclined position relative to the axis of the wheel axle 30 such that the mounting wall 342 is disposed perpendicular to the corresponding spoke fastener 52. In the embodiment shown in FIG. 4, the spoke mounting holes 421 are formed in the annular base wall 42' of the wheel rim 4', and the base wall 42' thus serves as the spoke mounting portion of the wheel rim 4'. The connecting wall 43' is formed with a plurality of passage holes 433 to permit passage of the spokes 5 therethrough. The enlarged head portions 511 on the outer ends 51 of the spokes 5 abut against a radial outer surface 423 of the base wall 42'.

Figure 5:
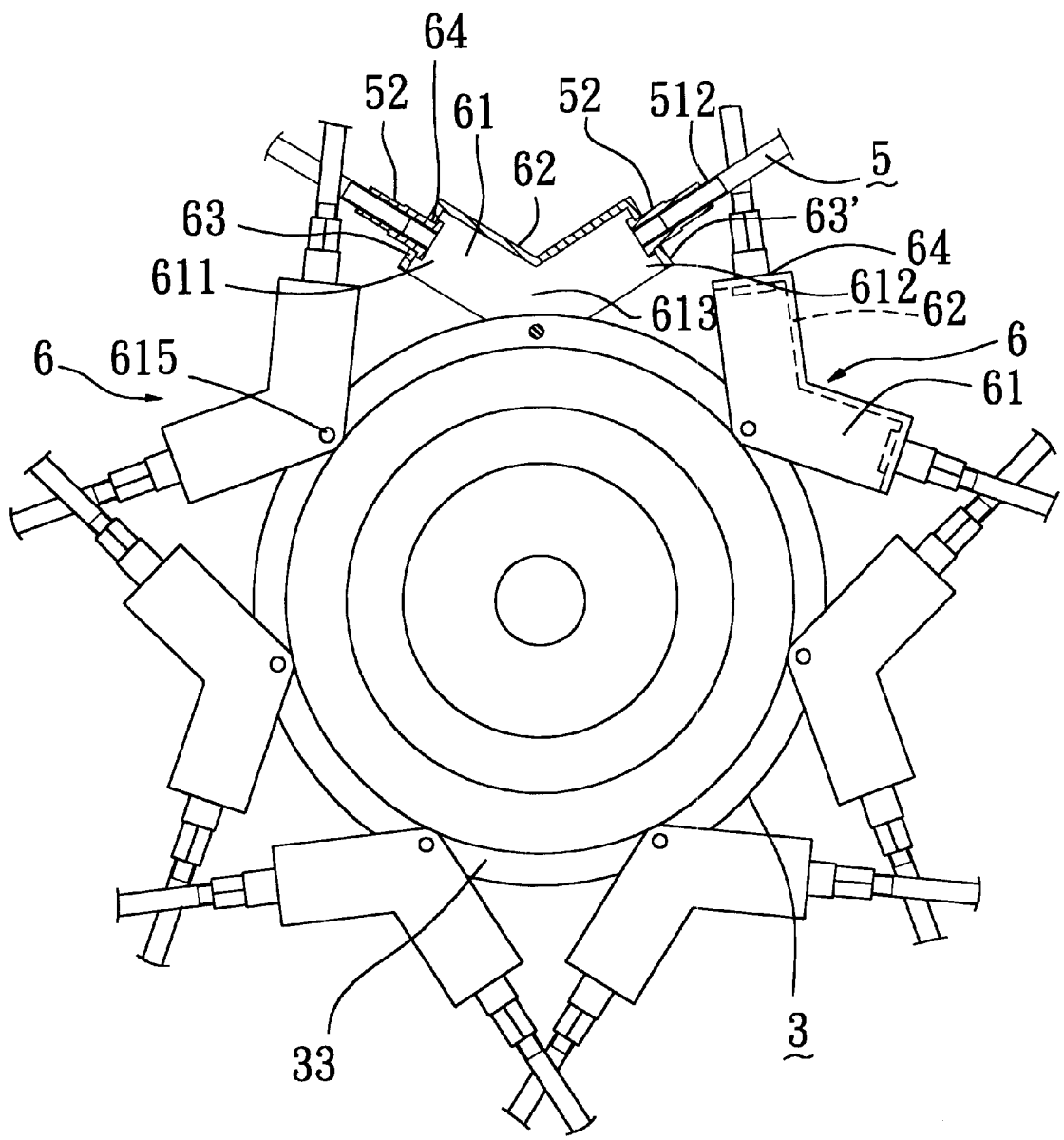
FIG. 5 is a fragmentary side view of the third preferred embodiment of a bicycle wheel according to the present invention.

Referring to FIG. 5, in the third preferred embodiment of this invention, each of the side walls 61 of the mounting seats 6 is formed to have a V-shaped configuration with opposite first and second ends 611, 612 and an intermediate portion 613 between the first and second ends 611, 612. The side walls 61 are formed with aligned through holes 615 at the intermediate portions 613 and are pivoted to the corresponding mounting flange 33 of the hub 3 at a respective pivot hole 331. The side wall 61 are connected to each other at radial outer edge portions thereof by a bridging wall 62. A first mounting wall 63 extends between the first ends 611 of the side walls 61. A second mounting wall 63' extends between the second ends 612 of the side walls 61. Each of the first and second mounting walls 63, 63' confronts the wheel rim (not shown), and is formed with a mounting hole 64 for mounting with a respective spoke fastener (not shown) in the manner described hereinabove.

During assembly of the spokes 5 to the mounting seats 34, 34', 6, the mounting seats 34, 34', 6 are pivotable about axes of the corresponding pivot holes 331 to permit adjustment in positions of the mounting holes 343, 64 for ensuring alignment between the mounting holes 343, 64 and the corresponding spoke mounting holes 411, 421 in the wheel rim 4, 4'.

During the manufacture of the bicycle wheel of the present invention, it is not required to form the inclined spoke fastening holes 103 in the hub 10 by drilling through the axially extending annular flanges 101 of the hub 10, as taught in the aforementioned prior art. Formation of the pivot holes 331 through the annular flanges 33 of the hub 3 of the bicycle wheel of the present invention can be easily conducted by punching. Moreover, the mounting seats 34 can be mass-produced using a conventional CNC processing machine.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A bicycle wheel for installation on a wheel axle having an axis said bicycle wheel comprising:
    a hub for mounting rotatably on the wheel axle, said hub having left and right end portions which are opposite to each other along an axis of the wheel axle, said left and right end portions being formed with respective annular mounting flanges which surround the axis of the wheel axle;
    a plurality of mounting seats arranged around the axis of the wheel axle and mounted pivotally on said mounting flanges of said hub;
    a wheel rim disposed around said hub and said mounting seats, said wheel rim including an annular tire retaining portion and an annular spoke mounting portion which extends radially and inwardly from said tire retaining portion; and
    a plurality of spokes having outer ends mounted on said spoke mounting portion of said wheel rim, and inner ends mounted on said mounting seats for mounting said wheel rim on said hub,
    wherein said mounting seats are pivoted to said mounting flanges of said hub so as to be pivotable about pivot axes that are parallel to the axis of the wheel axle, and
    wherein each of said mounting flanges of said hub has a plurality of pivot holes formed therethrough, said pivot holes having axes parallel to the axis of the wheel axle and being arranged around and angularly spaced apart relative to the axis of the wheel axle, each of said mounting seats including first and second side walls respectively disposed on opposite left and right sides of a corresponding one of said mounting flanges and which are formed with aligned through holes that are aligned with a respective one of said pivot holes in the corresponding one of said mounting flanges, each of said mounting seats further including at least one mounting wall interconnecting said side walls and formed with a mounting hole for mounting said inner end of a respective one of said spokes, and pivot shaft extending through said through holes and the respective one of said pivot holes.

2. The bicycle wheel as claimed in claim 1, further comprising a plurality of spoke fasteners, each having an enlarged head portion disposed within a respective one of said mounting seats and abutting against said mounting wall of the respective one of said mounting seats, and an internally threaded shank portion connected to said enlarged head portion and extending through said mounting hole in said mounting wall of the respective one of said mounting seats, said inner end of each of said spokes being formed with an external screw thread and engaging threadedly said shank portion of a respective one of said spoke fasteners.

3. The bicycle wheel as claimed in claim 2, wherein said wheel rim includes a pair of spaced-apart annular tire retaining walls, each of said tire retaining walls having radial inner and radial outer sections and an intermediate portion between said radial inner and radial outer sections, said wheel rim further including an annular connecting wall extending between said intermediate portions of said tire retaining walls, said radial outer sections of said tire retaining walls and said connecting wall serving as said tire retaining portion of said wheel rim, said radial inner sections of said tire retaining walls serving as said spoke mounting portion of said wheel rim, said radial inner section of each of said tire retaining walls having a lateral outer surface and being formed with a plurality of spoke mounting holes, each of said spokes extending through a respective one of said spoke mounting holes in said radial inner sections of said tire retaining walls, said outer end of each of said spokes having an enlarged head portion abutting against said lateral outer surface of said radial inner section of a corresponding one of said tire retaining walls.

4. The bicycle wheel as claimed in claim 2, wherein said wheel rim includes a pair of spaced-apart annular tire retaining walls, each of said tire retaining walls having radial inner and radial outer sections and an intermediate portion between said radial inner and radial outer sections, said wheel rim further including an annular connecting wall extending between said intermediate portions of said tire retaining walls and an annular base wall extending between said radial inner sections of said tire retaining walls, said radial outer sections of said tire retaining walls and said connecting wall serving as said tire retaining portion of said wheel rim, said annular base wall serving as said spoke mounting portion of said wheel rim, said annular base wall having a radial outer surface confronting said connecting wall and being formed with a plurality of spoke mounting holes, each of said spokes extending through a respective one of said spoke mounting holes in said base wall, said outer end of each of said spokes having an enlarged head portion abutting against said radial outer surface of said base wall, said connecting wall being formed with a plurality of passage holes to permit passage of said spokes therethrough.

5. The bicycle wheel as claimed in claim 1, wherein each of said side walls of said mounting seats has a V-shaped configuration with opposite first and second ends and an intermediate portion between said first and second ends, said intermediate portions of said sidewalls being formed with said through holes, each of said mounting seats having a second said mounting wall, the one said mounting wall extending between said first ends of said side walls, and the second said mounting wall extending between said second ends of said side walls.

* * * * *